United States Patent

[11] 3,573,455

[72] Inventor John Suierveld
 Wappingers Falls, N.Y.
[21] Appl. No. 759,575
[22] Filed Sept. 13, 1968
[45] Patented Apr. 6, 1971
[73] Assignee International Business Machines Corporation
 Armonk, N.Y.

[54] EXAMINATION OF ARTICLES BY X-RAYS
 13 Claims, 9 Drawing Figs.
[52] U.S. Cl. .................................................. 250/65,
 40/106.1, 156/64
[51] Int. Cl. ....................................................... G01n 23/04
[50] Field of Search .......................................... 250/65;
 156/64; 356/202; 40/106.1; 117/(Inquired)

[56] References Cited
 UNITED STATES PATENTS
3,447,924 6/1969 Trzyna et al. .................. 250/65X Primary Examiner—William F. Lindquist
Assistant Examiner—Davis L. Willis
Attorney—Hanifin and Jancin ABSTRACT: Superimposed X-ray photographs of a partly and/or completely formed laminar printed circuit article, taken before and after a given stage of an article lamination process, are viewed and/or photographed through magnifying optics. Otherwise undetectable dimensional shifts in the article are revealed in this manner at an early stage of manufacture. The problems of assuring precise spatial orientation of the article during the x-ray photography, and of providing an accurate frame of reference for registration of the superimposed photographs, are solved. A special fixture and template are provided for this purpose. The template and article are separately photographed on each film by a double exposure technique. Template and article are separately fixed in orientation relative to the x-ray film by means of the special fixture. The template exposure image constitutes the desired frame of reference for registration of superimposed photograph transparencies. Locating pins on the fixture mate with holes on the template for one x-ray exposure and holes on the article for a second x-ray exposure. The locating pins and the precisely tooled flat surface of the fixture against which the film is held form an absolute frame of reference in three dimensional space.

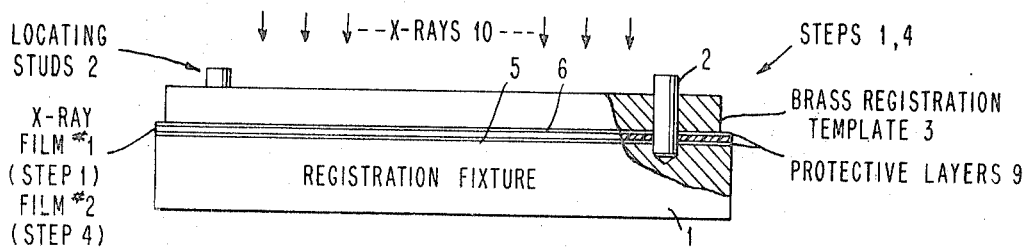
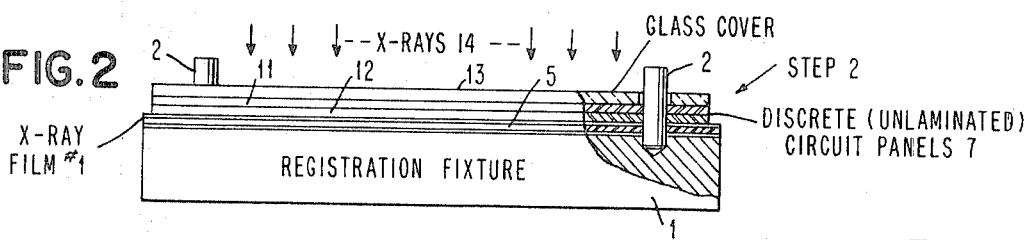
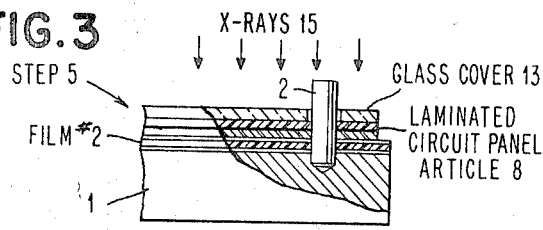
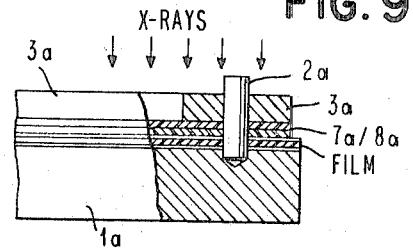
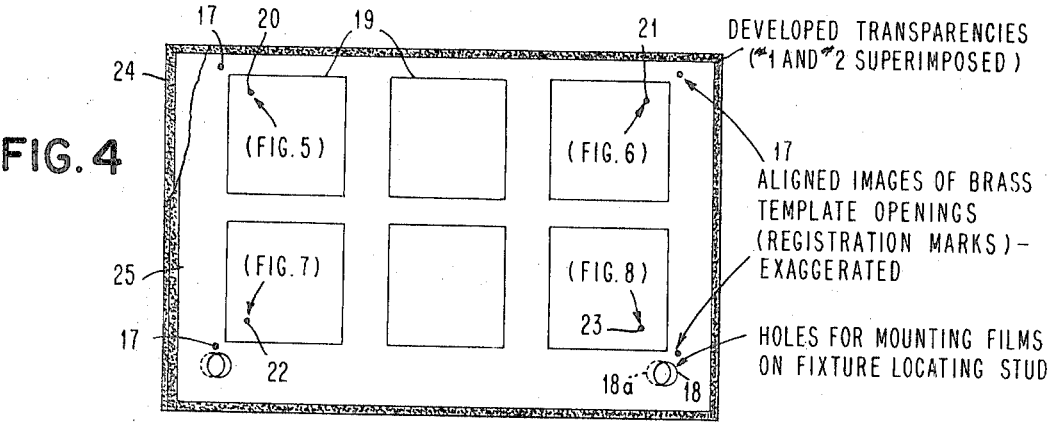
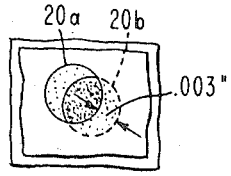
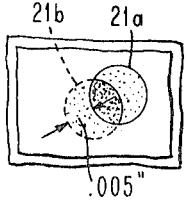
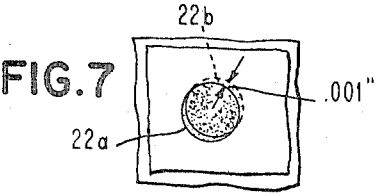
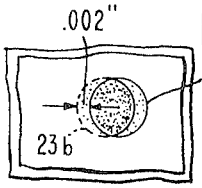

EXAMINATION OF ARTICLES BY X-RAYS

BACKGROUND OF THE INVENTION

1 Field of the Invention

The invention pertains generally to close tolerance inspection of an article by examination of superimposed x-ray photographs of the article taken at different stages of manufacture. In particular the invention concerns such examination of articles through superimposed x-ray photograph transparencies developed from x-ray exposures taken before and after the article has received a particular stress or form of handling. The superimposed photographs are positioned in accurate relative registration through alignment of reference marks on the films. Small areas of the superimposed radiographs are magnified and can be photographed in ordinary light to create a permanent record of a change in an article feature.

Many finely detailed density features of articles of manufacture, for example, clearance hole formations in circuit devices of laminar construction as described herein, are subject to slight and possibly intolerable dimensional changes during handling (e.g. lamination). The invention contemplates detection and/or measurement of such changes from superimposed x-ray photographs of the article taken at different stages of handling or manufacture. The article is precisely oriented for each radiograph by means of a special fixture, and the radiographs are accurately registered when superimposed. The defects observed from the registered radiographs are used to establish adjustments of the article manufacturing or handling process and/or the acceptability of the inspected article for further use. A template matched to the special fixture projects an x-ray image of reference marks on each x-ray film. The superimposed films are registered by alignment of these marks.

2. Description of the Prior Art

It is generally known that side by side comparison of x-ray photographs is useful to indicate on a coarse scale progressive changes in the x-ray profile of a changing article (for example a tooth, as shown in U.S. Pat. No. 3,336,671 to Puckett). However, such comparisons are not generally useful to provide the precision needed to detect very small changes, on the order of 0.002 inch, in the outline position of a slightly shifting density feature of an article. The present invention provides one convenient approach to such precise inspection by providing an exact frame of reference for the x-ray photography which assures exact control of the position and orientation of the article relative to the film and exact location of the article image on the film relative to precision locating marks on the same film which are created during the x-ray photography.

SUMMARY OF THE INVENTION

Articles of manufacture fabricated to close tolerances in alignment, of the order of 0.002 inch in specific density features subject to delineation by x-ray photographs, may be inspected by the present method. The method is used either to permit analysis and adjustment of a stage of handling of the article in manufacture or to permit selective discrimination of acceptably formed articles. In a specific inspection application described herein a laminar printed circuit device is examined at discrete stages of lamination. The device, comprising laminations of epoxy glass panels, or sheets, bearing conductive material in circuit wiring patterns, is inspected through superimposed x-ray photograph transparencies. Superimposed and accurately registered x-ray photograph transparencies taken before and after a stage of lamination are illuminated by back-lighting and viewed from the front through magnifying optics. Shifts as small as 0.002 inch in any small density feature of the x-ray profile of the partly formed article may be distinguished. If desired, the observed shifts may be permanently recorded by taking an ordinary light photograph of the viewed area (through magnifying optics) of the superimposed x-ray films.

Registration of the superimposed x-ray photographs is accomplished by aligning registration marks on the two photographs while viewing the marks through magnifying optics. These marks are accurately located on the respective x-ray films in relation to the article images on the same films without uncertainty as to the position of the article relative to the film when the x-ray exposure is taken. The orientation of the article relative to the film and the placement of reference marks on the film is controlled by means of a special fixture used in the x-ray photography. The articles to be radiographed are provided with accurately spaced and precisely formed holes which exactly match and fit over similarly spaced and formed locating pins projecting from a reference surface in the fixture. A template opaque to x-rays, with holes also spaced and formed to fit the fixture locating pins, is used to project the desired mark images onto the film, preferably in a separate x-ray exposure. In this manner the template is first photographed in a fixed orientation relative to the film, exposing the film to x-rays only where there are registration mark openings in the template, and then, with the film held fixed in position, the template is detached and the article is x-rayed while mounted on the same locating pins in the same fixed orientation relative to the film. Thus the article image is accurately formed and accurately positioned relative to the template image. Superimposed film transparencies developed from two such x-ray photographs taken of one article can be positioned in true absolute registration by aligning the template mark images, viewing the same through magnifying optics if necessary. Shifts in the x-ray profile of the article, of the order of 0.002 inch, can be distinguished by viewing portions of the superimposed films through enlarging optics. The template marks are placed so as not to interfere with any variable density feature of the article image.

Related objects of the invention are to provide:

A method and associated apparatus for close tolerance inspection of variable density features of articles of manufacture.

A method for close tolerance inspection of a laminar printed circuit article to discover directional shifts in a variable density feature of the article, such as a through hole, clearance hole or a portion of a conductive line channel, due to stresses applied to the article in a stage of manufacture.

An improved method of evaluating the effectiveness of one or more discrete stages of a multistage process of article manufacture.

A method of inspecting a variable density feature of a partly formed laminar printed circuit device by x-rays, which makes it possible to detect positional shifts as small as 0.002 inch in the outline of a density feature of the article by virtue of the highly accurate formation of the article x-ray images and the provision of an accurate frame of reference for the inspection in the x-ray photographs.

These and other objects, features, and advantages of the invention will be apparent from the following detailed description of a particular embodiment thereof illustrated in the accompanying drawings.

BRIEF DESCRIPTION OF THE DRAWINGS

FIG. 1 is an end view partly in section of a subject arrangement of x-rays, registration fixture, template and films (film 01 and 02) which are disposed at different times in the indicated orientation, in steps 1 and 4 of the described method;

FIG. 2 is an end view, partly in section, of x-rays, fixture and film 01, as disposed in step 2 of subject method, wherein the template has been removed after the first x-ray exposure (method step 1) and replaced by the article of interest (separated panel members shown prior to being joined in the lamination operation designated step 3 of subject method);

FIG. 3 is an end view partly in section of x-rays, fixture and film 02 as seen in step 5 of subject method, with the template removed after the first exposure to x-rays (method step 4) and replaced by the article which has been formed by laminating together the separated panel members of FIG. 2;

FIG. 4 is a plan view of superimposed film transparencies developed from films 01 and 02 illustrating the registration of the films by alignment of the template exposure images.

FIGS. 5—8 are magnified views of density feature details of the superimposed article x-ray images presented in FIG. 4;

FIG. 9 is an end view partly in section of a variant of the apparatus shown in FIGS. 1 and 2 enabling the subject method to be accomplished in fewer steps of exposure to x-rays.

DETAILED DESCRIPTION OF THE INVENTION

Referring to the drawings, the method of the present invention is applied to the inspection of a laminar printed circuit article at discrete stages of lamination. The individual laminae of these articles are fabricated to close tolerances. Accuracies of the order of 0.002 inch may be required in the location and spacing of featured details, such as conductive line widths and spacings or clearance hole diameters and center spacings, which may become hidden from ordinary view as the complete article is formed.

Shrinkage of laminae in the process of lamination may result in intolerable misalignment of these features resulting in misalignments of such magnitudes to render through-hole drilling impossible. Thus, the process of lamination must be conducted with great care and precision, and the effects of the process should be inspected and analyzed with equal precision.

For such inspection I disclose herein the comparison of superimposed x-ray photographs of the partly formed article taken before and after any stage in the lamination process. The radiographs, which naturally are in the form of transparencies, are viewed through magnifying optics in superimposed relation. Registration of the superimposed radiographs is achieved by means of marks placed on the films in a double exposure procedure. In this procedure the film is first exposed to x-rays through a masking template having precisely registered openings and then, with the template removed and the film held fixed in position, another x-ray exposure is taken, this time with the film covered by the article which is to be analyzed (e.g. the physically separate or joined laminae). The said article is positioned in accurate orientation relative to the film, and in registration with the template image, by means of a reference (registration) fixture.

Referring to FIGS. 1—3 the registration fixture 1 is preferably formed of a hard and dense material, such as steel, and includes as an integral extension thereof a number (two in the present particular arrangement) of locating pins 2. It will be understood from the discussion below that although a fixture with two locating pins is suggested in the illustration, a lesser or greater number of pins or the like could be used for the same locating purpose. It will be understood further that although the shape of the pins is shown as cylindrical, other shapes would be suitable, and means other than studs might be employed for the same purpose of precisely locating and orienting the objects to be photographed.

The masking template 3 (FIG. 1) is a brass plate with precisely tooled holes adapted to fit precisely over the pins 2 of the registration fixture with less than 0.0002 inch of clearance. The template 3 also has carefully tooled smaller openings (not indicated) for producing the registration mark images having a shape and size dependent upon application by means of which the superimposed films are ultimately aligned in precise registration. The template is sufficiently thick (⅛ inch) to be virtually opaque to the x-rays used in the present radiographic application and exposures everywhere except where registration mark openings have been made. The surfaces 5, of the fixture, and 6, of the template, are highly planar and precisely tooled to assure accurate orientation of the template (and article) relative to the film as discussed later.

The circuit device article to be examined, which may consist of copper-clad epoxy glass layers with conductive matter in etched or built up channel regions, is shown prior to lamination at 7 (FIG. 2) and after lamination at 8 (FIG. 3). The individual laminae and films discussed below are also provided with precisely formed and spaced holes for mounting with 0.0002 or less inch of clearance over the studs 2 of the fixture 1; for example by an accurately tooled two-hole drill fixture.

The x-ray exposures and lamination of the article occur in the following exemplary sequence of steps.

1. Film 01, surrounded by protective layers 9 of its original paper wrapping in order to prevent exposure to light, and template 3 are mounted on fixture 1 (FIG. 1) and briefly exposed to x-rays 10 applied with appropriate direction, duration, and intensity to produce the desired image of the template registration openings on the film. In the particular application the x-ray source was positioned 84 inches above the film and energized for 60 seconds at a voltage of 90 kv. and current of 4 ma.
2. With film 01 held fixed in position the template is removed and the separated laminae 11, 12 of the as yet unformed article are mounted on the fixture over film 01. A glass cover 13 is used to hold the article and film flat against the fixture. Film 01 is exposed for a second time to x-rays 14 (FIG. 2), with the voltage parameter of this exposure selectively set at a value between 90—110 kv., in proportion to the thickness of the article, to create the desired clarity of image of the unformed article on film 01. The latter image is situated in precise relation to the template image since the film has not been moved. Since the template 3 of FIG. 1 is relatively impervious to the x-rays 10 over all areas of film which may be exposed to article features of interest, the definition of the article image formed by the x-rays 14 in such areas is unaffected by the first exposure. The parts 11, 12 and film 01 are removed from the fixture and film 01 is developed.
3. The circuit parts 11, 12 are laminated together.
4. Film 02 and template 3 are mounted on fixture 1 for a first exposure of film 02 to x-rays 10 (FIG. 1).
5. Template 3 is replaced in the fixture (FIG. 3) by the laminated single part 8, formed by the union of parts 11 and 12 (FIG. 2), and glass cover 13, while film 02 remains fixed in position. Film 02 is exposed (FIG. 3) to x-rays 15, and removed from the fixture for development.
6. The developed transparencies derived from films 01 and 02 are mounted in superimposed registration (FIG. 4) on any of the well-known commercial light tables and inspected closely by means of magnifying optics. The images of article features and template openings naturally appear as darkened areas on the films. One film is held fixed in position while the other film is shifted in small increments of movement, and temporarily fastened in position between movements, until the template registration mark images 17 on the two films are all in superimposed registration. The marks are viewed through a 5× magnifying eyepiece to obtain precise alignment. At this point the fixture mounting holes 18, 18a in the films may or may not be aligned since the cellulose material of the film is subject to slight distortion as the film is handled on the fixture and in processing. Indeed it is this inherent infirmity of film materials that necessitates the extra steps of the foregoing template and double exposure technique. As seen in FIG. 4 the particular article shown in the photographs contains six discrete sections 19 of circuit and hole patterns which in a later stage of manufacture may be separated by slicing. Specific hole features 20—23 are shown enlarged in FIGS. 5—8. For clarity the numerous other features are not shown in the drawing. The radiographs have darkened border areas 24, 25 where the article and template did not cover the films.
7. The superimposed pairs of x-ray images 20a, 20b—23a, 23b of the specific clearance hole features, of the pre- and post-laminated article, designated in FIG. 4 are shown as viewed through 30× enlarging eyepieces with the developed films in registration, in FIGS. 5—8. As suggested in these FIGS. shrinkage in the lamination stage can be random over the surface area of the article, in both magnitude and direction. It is observed that enlarged comparative views of density features such as these may be photographed immediately in the ordinary light of the light table to create a permanent record of dimensional shift which is not subject to relative distortion as by differences in handling of the individual superimposed photographs.

It is observed that the registration marks 17 are placed on the film at otherwise lightly exposed areas free of density feature images so that there is no interference between mark images and article density feature images.

It is apparent from the drawing that the surface 5 and locating pins 2 of the fixture 1 provide an accurate frame of reference both for orientation and positioning of the template relative to the film, and orientation and positioning of the printed circuit parts or article relative to the film. The arrangement shown in particularly accurate and effective because all parts to be radiographed are laid flat upon the base formed by the accurately tooled level surface 5, and are thereby properly oriented at all points above the film with virtually no possibility of chance misalignment. Clearly, however, other fixture and template arrangements will readily occur to those skilled in the relevant arts once they have recognized the essential requirements for accurate orientation and positioning of the article and template (or equivalent) relative to the x-ray film.

Thus for example it would be considered within the scope of the present invention, as claimed below, to employ a fixture 1a, template 3a and films which are dimensioned to provide the desired x-ray picture in a single exposure, as suggested in FIG. 9. The template would border the article 7a/8a in "picture-frame" fashion, permitting x-ray photography of the article and the template reference marks to be accomplished in a single step x-ray exposure. Note however that this arrangement may be limited as to the thickness of the article which can be radiographed since the template must fit over the article on the locating pins, and it restricts the area of circuit designs which may be inspected since the design must lie wholly within the border of the template.

We have shown and described above the fundamental novel features of the invention as applied to a preferred embodiment. It will be understood that various omissions, substitutions and changes in form and detail, of the invention as described herein, may be made by those skilled in the art without departing from the true spirit and scope of the invention. It is the intention therefore to be limited only by the scope of the following claims:

I claim:

1. A method of closely examining an article of manufacture for normally invisible defects in manufacture comprising:
   holding the article to be examined in an accurately controlled position and orientation relative to an x-ray film;
   exposing said article and film to x-rays for a predetermined interval of time and with a predetermined intensity and direction of radiation;
   developing said film into a transparency containing a visible image of the density features of said article;
   superimposing said developed transparency, for viewing, over another x-ray photograph of the same article taken at a different stage of manufacture thereof with the article held in identical position and orientation and exposed to x-radiation;
   adjusting said superimposed x-ray photographs into registration relative to an accurate frame of reference common to both radiographs; and
   visually inspecting said adjusted superimposed radiographs for signs of variation in the images of said article density features.

2. The method of claim 1 wherein:
   said article is a partially formed laminar printed circuit device; and
   said superimposed x-ray photographs are radiographs taken of the partially formed device before and after a particular stage of lamination.

3. The method of claim 1 wherein said common frame of reference is represented by visible marks precisely located on each of the said superimposed x-ray photographs.

4. The method of claim 3 wherein said step of adjusting said radiographs into registration is accomplished by adjusting corresponding ones of said marks on said superimposed radiographs into precise superimposed alignment.

5. The method of claim 4 wherein said marks are produced on said radiographs by exposing said film mentioned in claim 1 to x-rays through an object opaque to x-rays (under conditions used) having openings corresponding to said marks.

6. The method of claim 5 wherein said x-ray produced marks and article density features are located in different areas of said photograph so as not to obscure the said article features in said inspecting step.

7. The method of claim 4 wherein said marks are made by holding said article and a mark template shaped to match said article in relatively predetermined positions and orientations relative to said film during the steps of holding and exposing mentioned in claim 1.

8. A method of examining laminar printed circuit device articles for positional deviations in the density features of individual lamina caused by stresses of the lamination process comprising:
   at a first particular stage of said lamination process exposing said article to x-rays while said article is held in a fixed position and orientation relative to an x-ray sensitive radiographic film, said article being held in contact with said film over a substantial surface area of interest thereof;
   at the same said first particular stage of said lamination process exposing said first film separately to x-rays without said article, through a reference-marking template held adjacent said first film in the same relative position and orientation as said article during said first mentioned step of exposing; said x-rays directed respectively at said article and template being in the same direction relative to said film whereby an accurate composite image of mark openings in said template and features of said article as formed at said first particular stage is produced on said first film;
   at a second particular stage of said lamination process repeating the above steps of separately exposing said article and template to x-rays in the said predetermined position and orientation relative to a second film, to produce a composite image on said second film of the said template mark openings and the density features of said article as formed at said second particular stage;
   developing said first and second films into respective first and second visible radiographs of said composite x-ray exposure images; and
   examining said first and second photographs comparatively employing said reference marks as a common frame of reference for locating corresponding density features in said photographs.

9. The method of claim 8 wherein said step of examining is carried out by:
   mounting said photographs in superimposed position over a source of visible light;
   said radiographs being transparencies;
   adjusting said superimposed radiographs with reference to said reference mark images into absolute registration; and
   inspecting a small area of said registered photographs for differences in the outline of a density feature portrayed in said small area.

10. The method of claim 9 wherein said adjusting step is carried out by maneuvering the photographs until corresponding reference marks are in superimposed alignment.

11. The method of claim 10 wherein said marks are viewed through enlarging optics during said maneuvering.

12. The method of claim 9 wherein said small area is viewed through enlarging optics in the course of said inspection.

13. The method of claim 12 including the step of photographing said enlarged view of said small area of superimposed density features to create a permanent record of the superimposed magnified view which is not subject to the relative variations in handling of the individual radiographs from which the view is derived.